United States Patent [19]

Cummins

[11] Patent Number: 4,642,763

[45] Date of Patent: Feb. 10, 1987

[54] BATCH FILE PROCESSING

[75] Inventor: Edmund M. Cummins, Gwinnett County, Ga.

[73] Assignee: International Business Machines Corp., Armonk, N.Y.

[21] Appl. No.: 726,341

[22] Filed: Apr. 23, 1985

[51] Int. Cl.⁴ .............................................. G06F 9/40
[52] U.S. Cl. ................................................... 364/300
[58] Field of Search ......................................... 364/300

[56] References Cited

U.S. PATENT DOCUMENTS 4,468,732 8/1984 Raver ............................. 364/300 X Primary Examiner—Raulfe B. Zache
Attorney, Agent, or Firm—C. Lamont Whitham; Thomas F. Galvin

[57] ABSTRACT

A method for improving the performance of application programs which run under a disk operating system (DOS) is disclosed. The problem addressed is that of poor application performance caused by repetitive disk accesses when using large batch files. This problem is alleviated by using a batch file memory buffer of variable size, processing the most frequently used DOS/BATCH commands internally, and passing low usage commands to DOS by using a secondary command processor.

7 Claims, 40 Drawing Figures

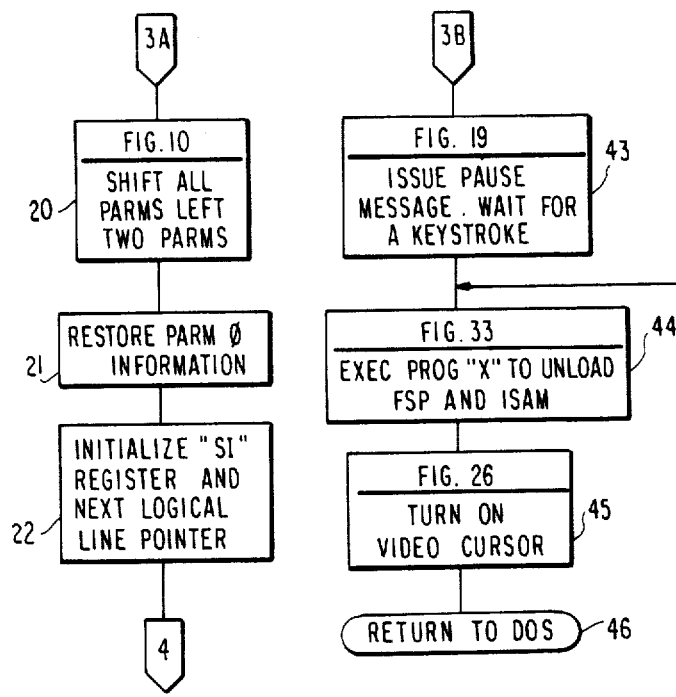
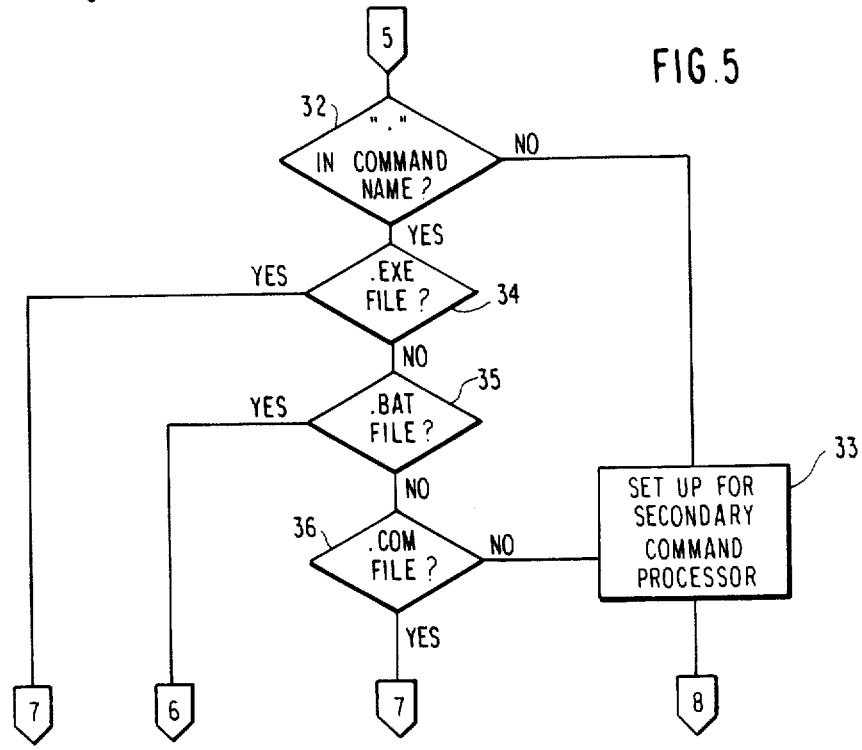
FIG. 3
FIG. 5

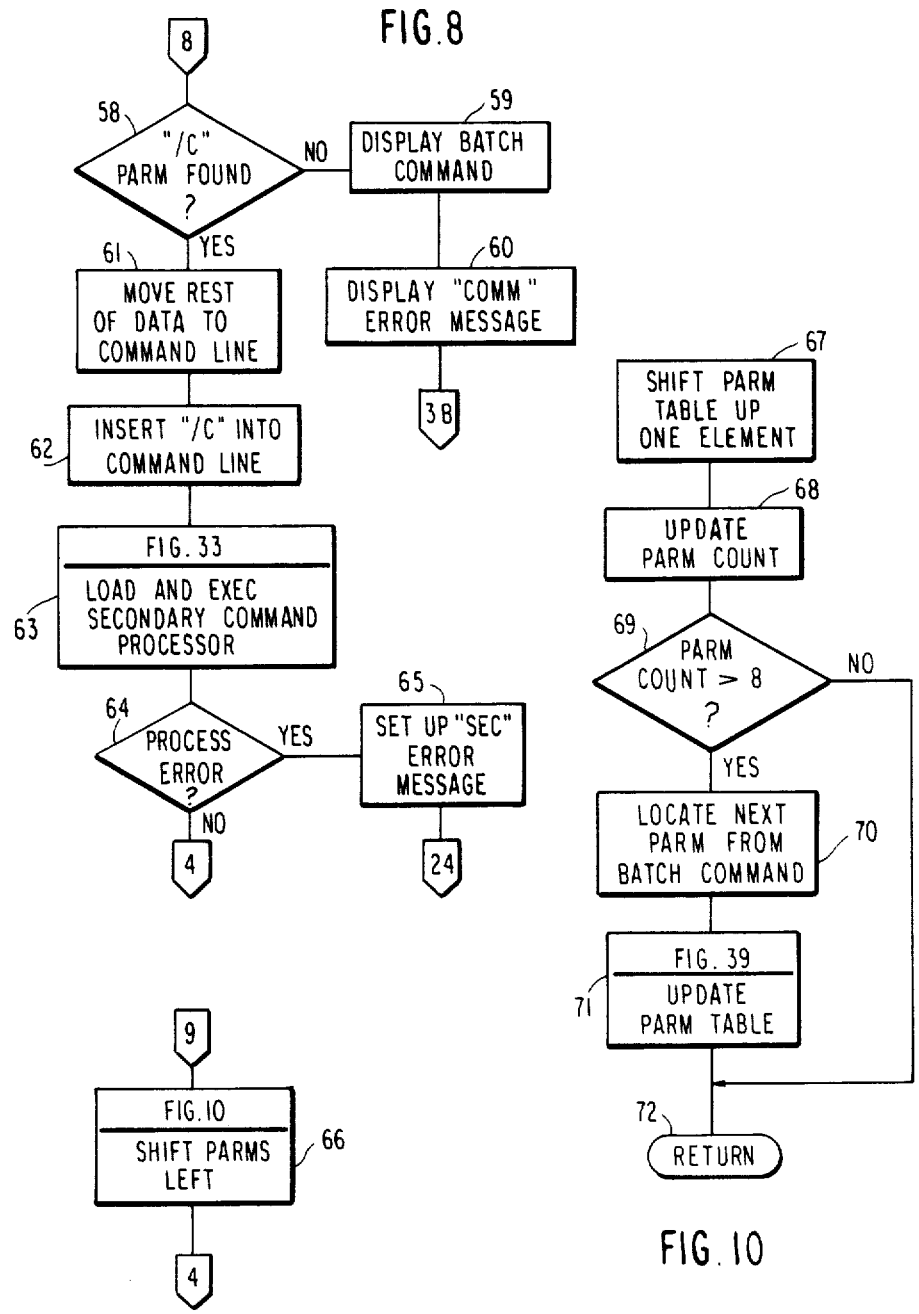

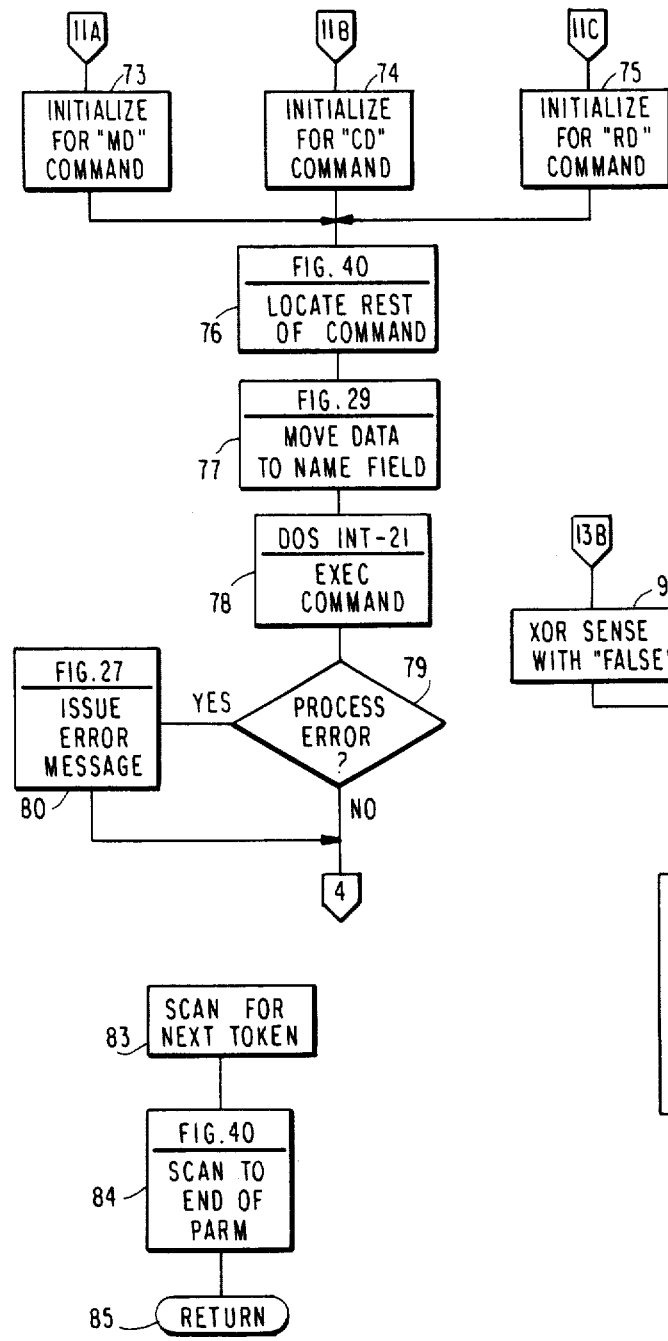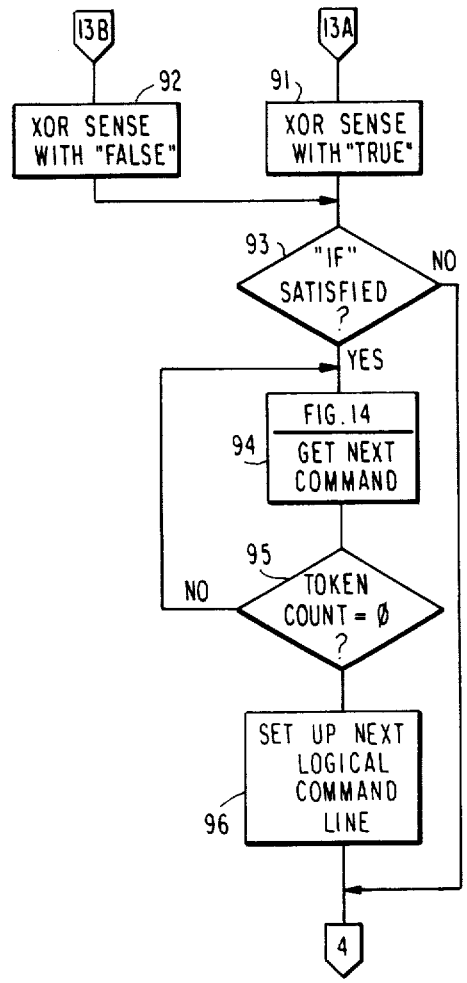

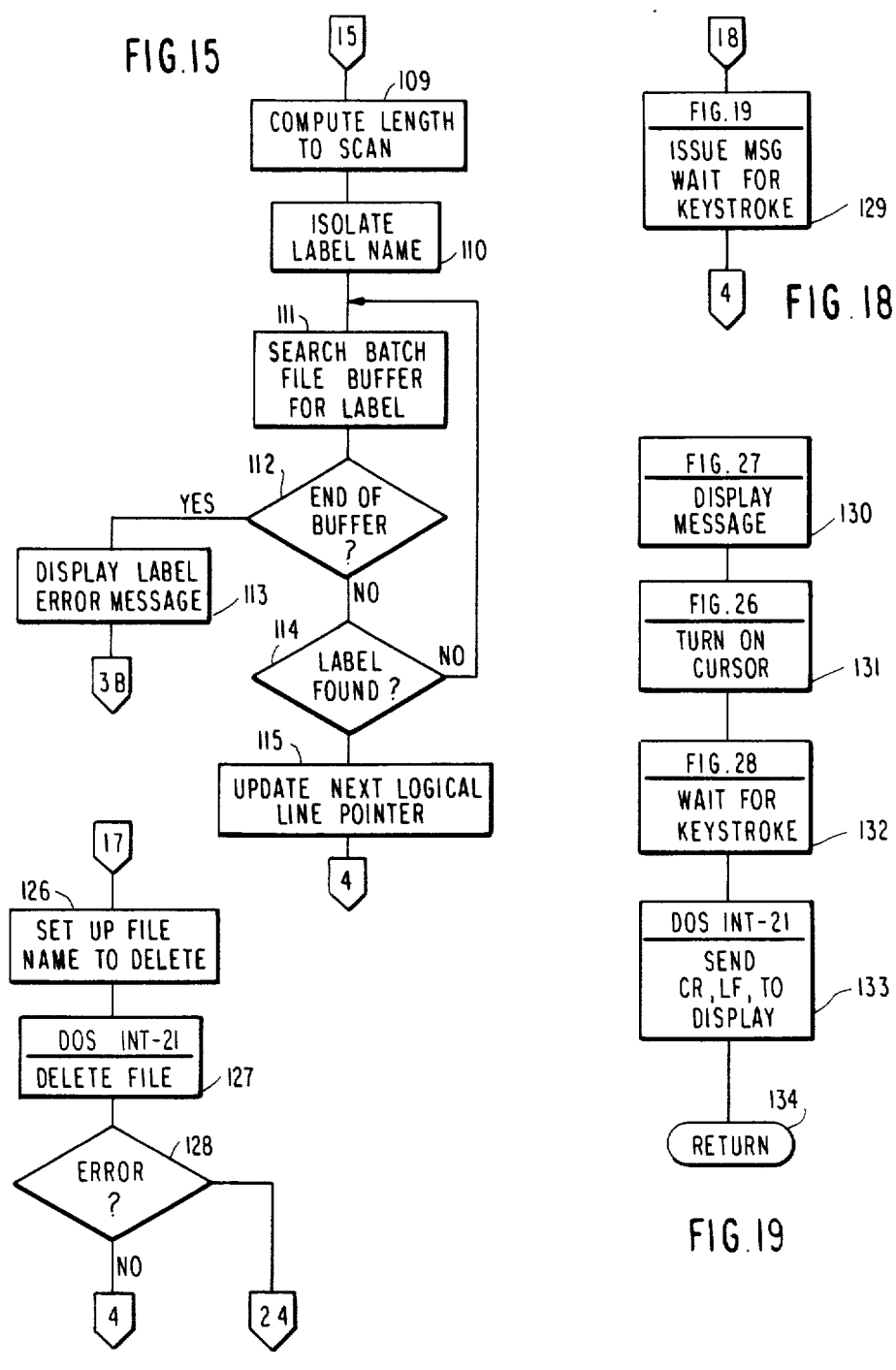

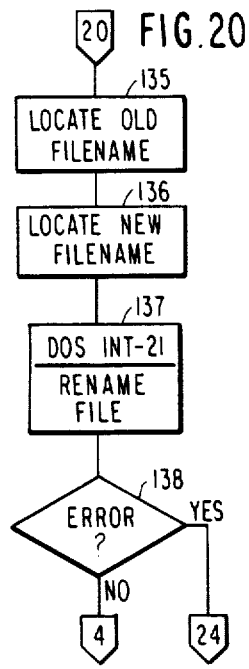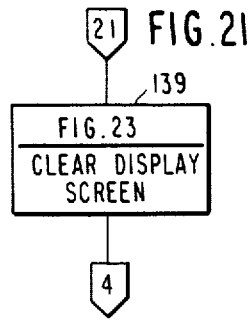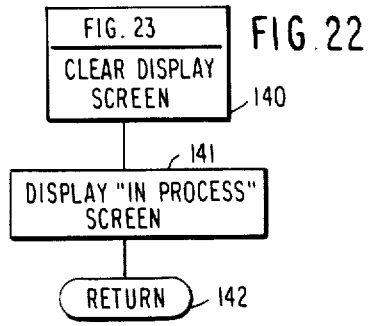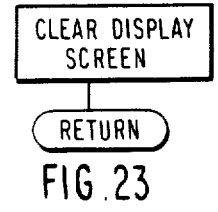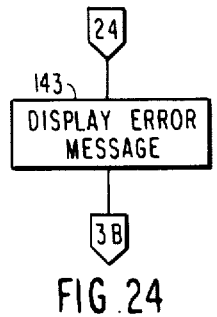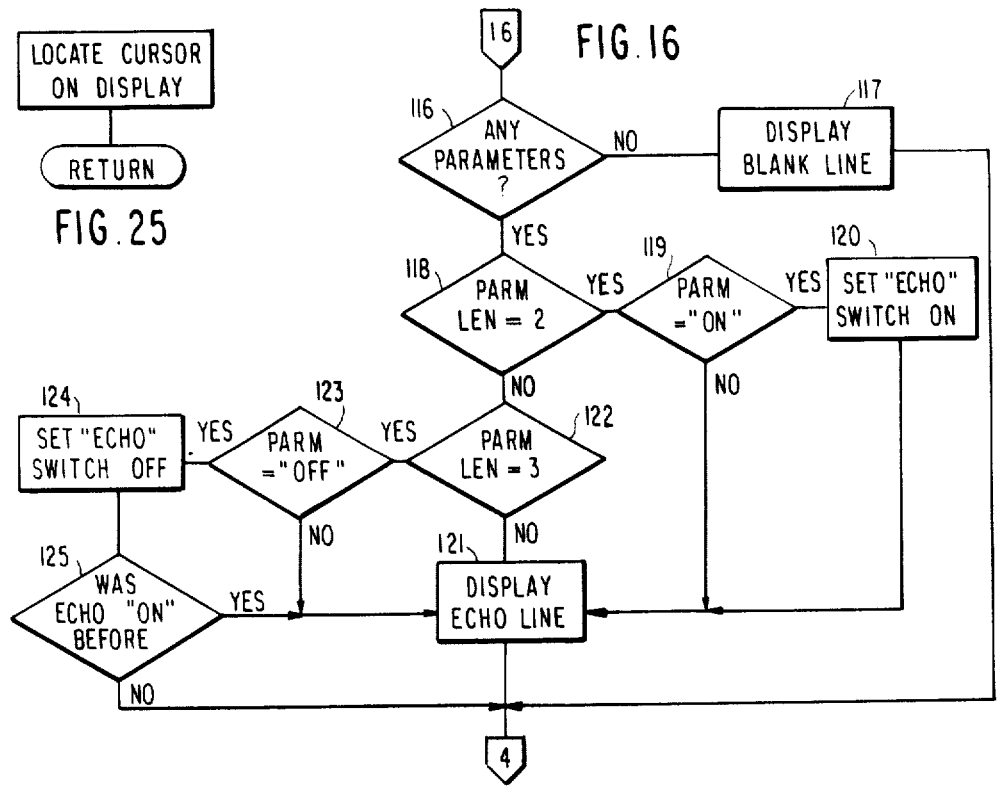

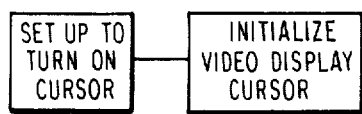 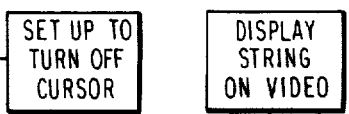 
FIG.26  FIG.27  FIG.28
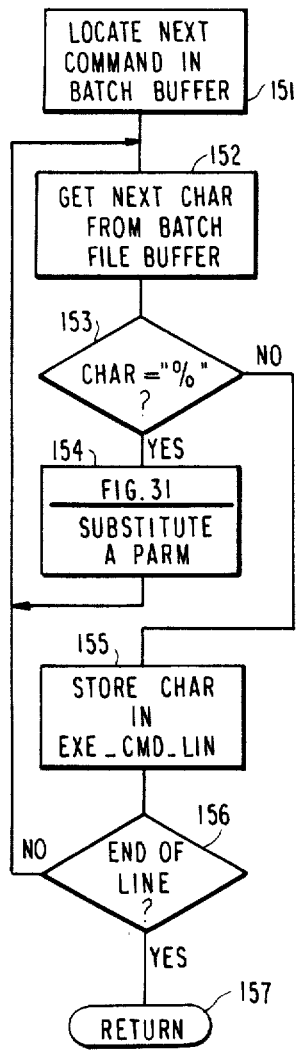
FIG.30
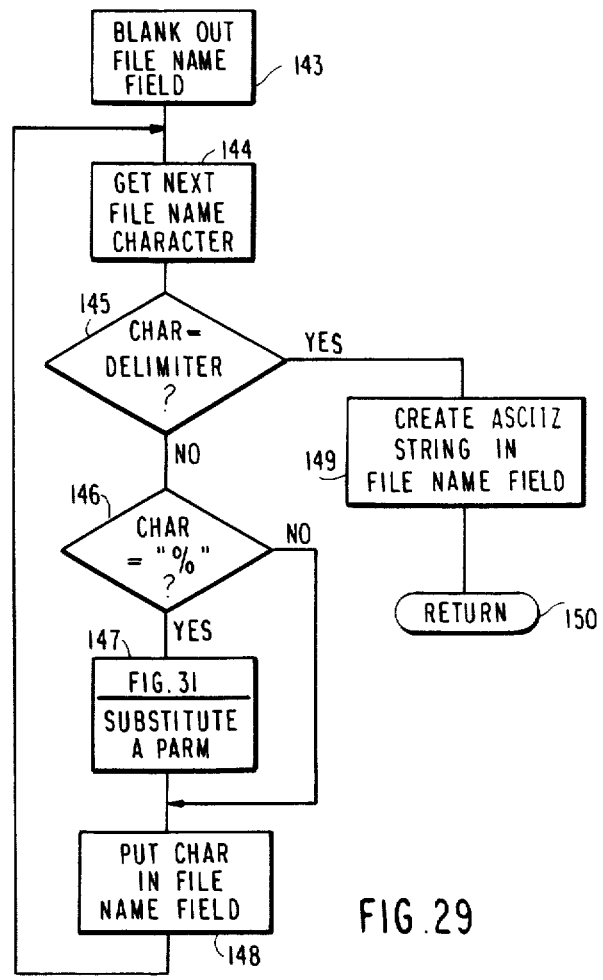
FIG.29

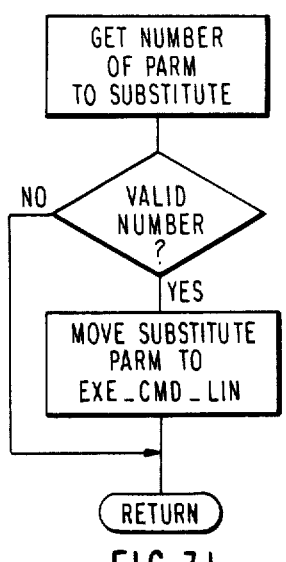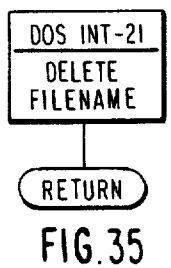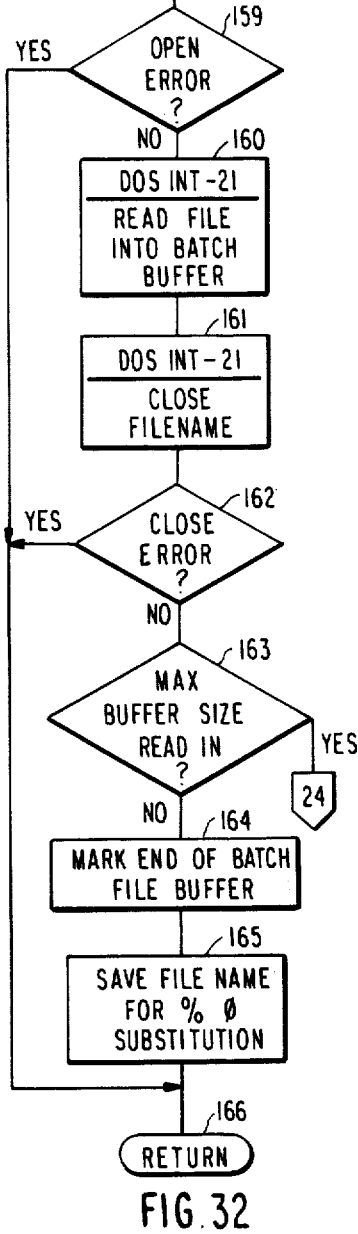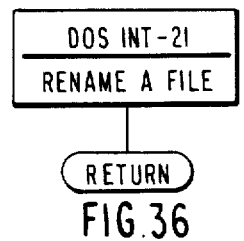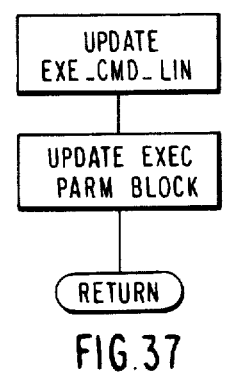

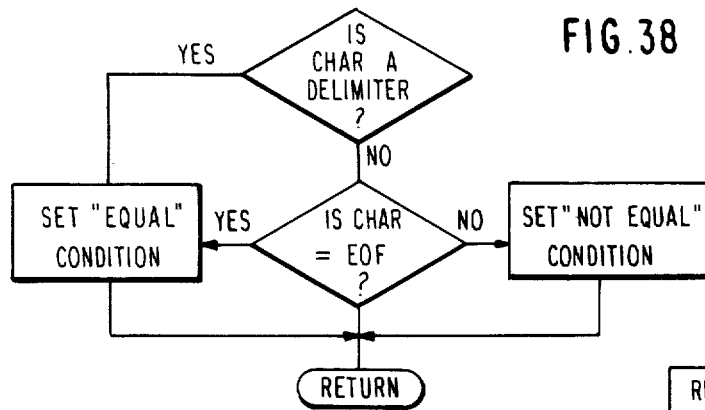
FIG. 38
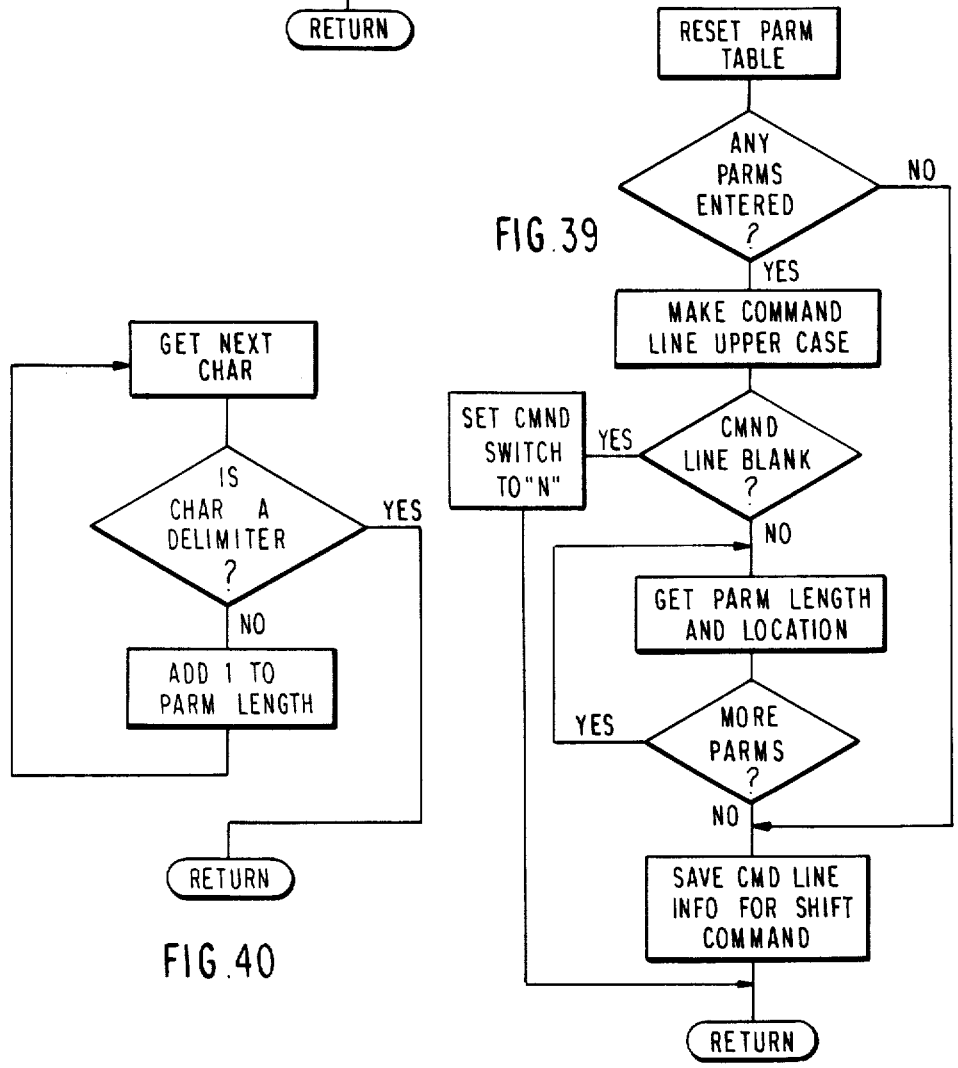
FIG. 39
FIG. 40

BATCH FILE PROCESSING

DESCRIPTION

1. Technical Field

This invention generally relates to a method for improving the performance of application programs which run under a disk operating system (DOS) and, more particularly, to an improved way of handling DOS batch (.BAT) files.

2. Prior Art

Personal computers use a disk operating system which is a set of commands or programs that the computer uses to perform specific tasks. There are times when a user will want to run the same set of DOS commands over and over. The disk operating system provides a way of doing this without having to retype the commands every time they are to be used. The commands are saved in a text file with a file extension of .BAT to signify that the file is a batch file. When a filename is entered from the keyboard, DOS first searches for an executable program with the entered filename. If such a program is not found, DOS then searches for a batch file with the entered filename. Assuming that a batch file is found with the entered filename, DOS will then input commands from the batch file instead of responding to inputs from the keyboard until the end of the batch file is reached, at which time inputs from the keyboard are again accepted.

In recent releases of DOS batch files can contain some programmed logic commands such as GOTO commands and IF/THEN commands to alter the command sequences. It is possible to test for the existence of a file and compare data string values. It is also possible to provide an ERRORLEVEL check to test for successful completion of a program, but this requires the terminating program to set the ERRORLEVEL field. Presently, the only two DOS programs that set this field are the BACKUP and RESTORE programs. Further information on a specific implementation of DOS may be had with reference to the IBM PC manual entitled *Disk Operating System* by Microsoft Corp., version 2.1 (1983). Additionally, reference is made hereinafter to the IBM PC manual entitled *Disk Operatinq System, Technical Reference*, by Microsoft Corp., version 2.1 (1983).

As useful as the batch functions of DOS are, the implementation suffers in the area of performance. A study of the external operation of the DOS batch processor suggests that the reason for this may be attributed to one or more of the following factors: First, batch file records are variable length and are terminated by a cariage return, line feed (CR/LF) character sequence. Every time DOS reads a record from the batch file, the file is "opened", which requires a disk input function to access the directory. Second, DOS reads only one logical batch record from the file for each disk access. Third, if DOS encounters a GOTO statement, it reads the file from the first logical record until it locates the necessary label. Fourth, if a program terminates abnormally, DOS continues to process batch file records until the end of the batch file is reached.

The foregoing characteristics of DOS help to explain why batch processing is slower than may be desirable in some circumstances. Each logical record from a batch file requires a minimum of two disk accesses. If the batch file directory entry is not in the first directory block read in, or if the logical batch file record is not in the first sector of the batch file, DOS must access the physical disk multiple times. As a result, batch performance is degraded by a factor based on the number of disk accesses required.

SUMMARY OF THE INVENTION

It is therefore an object of the present invention to improve the overall performance of batch processing under DOS and minimize the use of system resources to achieve an attendent improvement in the performance of application programs.

It is another object of the invention to provide a program of minimum size that processes the most frequently used DOS batch commands internally and passes low usage batch commands to a secondary command processor.

According to the invention, the basic operation of the batch file processing program is as follows: When the program receives control from DOS, it first calculates the amount of storage required for a batch file buffer. This batch file buffer is variable in size to allow the batch file processing program to use only as much memory for the file buffer as is actually required. The calculation made by the batch file processing program uses parameters passed to the program by DOS from the command line and all remaining memory is released back to DOS for program execution. The parameters passed to the batch file processing program from the command line are (1) the size of the buffer and (2) the name of the first batch file to be loaded. In the preferred and actually implemented embodiment of the invention, these parameters are written into a batch file in the application program by a programmer; however, it is also possible for the end user of the application program to key in the parameters on the command line. Alternatively, the size of the batch file buffer can be hard coded in to the batch file processing program in which case there would be no requirement to pass parameters to the program by DOS from the command line. This approach lacks the flexibility of the preferred and actually implemented embodiment since a determination must be made of the largest batch file buffer that will be allowed when the code is written for the batch file processing program. It is also possible to adopt an even more flexible approach than that which was adopted in the preferred and actually implemented embodiment. Specifically, the size of the batch file buffer can be dynamically determined by causing the batch file processing program to read the disk directory entry for the batch file to be loaded in order to determine the size of the buffer required. In any case, the batch file specified on the command line is loaded into the memory buffer for processing, and a main command processor module then proceeds to interrogate the batch file one logical record at a time. Control is passed to the appropriate routine to handle the DOS batch commands. Upon completion of a command, control is returned to the main command module. If the program encounters a request for another batch file, the next batch file is loaded into the buffer. The next record to be processed will be the first record in the new batch file.

In the case of the IBM PC DOS mentioned earlier, version 2.0 and later provides the functions needed to make the batch processor according to the invention work. The most important new function is the execute (EXEC) program. This allows a program to load another program into memory and execute it. When the second program terminates, the original program is given control again. Indicators are passed back to the original program to indicate the success or failure of the request. The other important new function is the SET-BLOCK function. This allows a program to specify the amount of memory it needs, and to free up the balance for use by other programs. This function is used in the batch processor according to the invention to allow the user to specify the size of the batch file buffer and to free up memory for use by the application programs. More detailed information regarding the use of these functions may be had with reference to Appendix E of the manual entitled *Disk Operating System* as well as the manual entitled *Disk Operating System, Technical Reference*, referenced above.

For application program execution, the batch file processor passes a request to DOS to load and execute an application program using the EXEC function. When the application program terminates, control is returned to the batch file processor. Indicators are returned from DOS that llow the batch file processor program to detect an abnormal termination condition of the application program and discontinue batch file processing. The ability to discontinue batch file processing if a program terminates abnormally is an improvement over DOS. DOS batch file processing will allow the rest of a batch file to be processed after abnormal termination of a program.

All DOS batch commands that are not processed internally within the program are executed by invoking a secondary processor. The same DOS EXEC function previously discussed is used to load and execute a second copy of the COMMAND.COM program. The DOS batch command is passed to COMMAND.COM on the command line in the program segment prefix area. This is a 128-byte area that is built by DOS for storing control information during program execution. The ability to load and execute a second copy of the COMMAND.COM program is one of the advanced functions provided by PC-DOS, versions 2.0 and later.

The batch processor according to the invention is actually a "SHELL" type program in that it maintains control of the system during batch file processing. The program improves system and application performance.

BRIEF DESCRIPTION OF THE DRAWINGS

The foregoing and other objects, aspects and advantages of the invention will be better understood from the following detailed description of a preferred embodiment with reference to the drawings, in which:

FIGS. 1 to 8, taken together, are the overall flow diagram of the batch processor according to the invention;

FIGS. 9 and 10 are, respectively, the flow diagrams of the SHIFT command processor and the shift subroutine used by the batch processor of FIGS. 1 to 8;

FIG. 11 is the flow diagram of the DIRECTORY command processor used by the batch processor of FIGS. 1 to 8;

FIGS. 12 and 13, taken together, are the flow diagram for the IF command processor, and FIG. 14 is the flow diagram of the IF subroutine, both of which are used by the batch processor of FIGS. 1 to 8;

FIG. 15 is the flow diagram of the GOTO command processor used by the batch processor of FIGS. 1 to 8;

FIG. 16 is the flow diagram of the ECHO command processor used by the batch processor of FIGS. 1 to 8;

FIG. 17 is the flow diagram of the ERASE command processor used by the batch processor of FIGS. 1 to 8;

FIGS. 18 and 19 are, respectively, the flow diagrams of the PAUSE command processor and the pause subroutine used by the batch processor of FIGS. 1 to 8;

FIG. 20 is the flow diagram of the RENAME command processor used by the batch processor of FIGS. 1 to 8; and FIGS. 21 to 40, inclusive, are flow diagrams of various processes and subroutines which are common to or used by the batch processor and the various command processors.

DETAILED DESCRIPTION OF THE PREFERRED EMBODIMENT OF THE INVENTION

Figure 1:
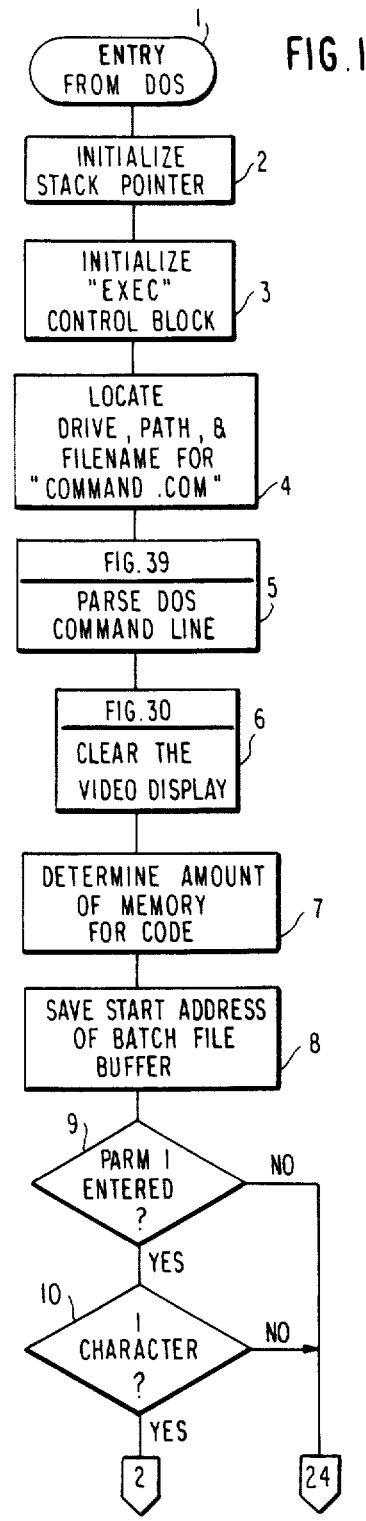

The preferred embodiment of the invention is designed for use with IBM PC DOS, versions 2.0 and later, and uses only IBM PC supported basic input output system (BIOS) and PC DOS functions. This allows the program to work, without modification, on future releases of PC DOS. Besides the references already cited for information on PC DOS, reference may be made to Appendix A of the *Technical Reference* for the IBM personal computer for a listing of the BIOS. The program size was limited to a maximum of 4096 bytes in assembly language to allow the program to take up the least amount of space on a fixed disk drive and keep memory use to a minimum. A 4096-byte program does not allow for simulation of all batch commands, so only the most frequently used PC DOS commands are processed internally. Low usage batch commands are passed to PC DOS for processing by using a secondary command processor. This is a new function introduced in PC DOS release 2.0. The program can pass commands to PC DOS and get back control after the command is processed. While the use of a secondary command processor does not require additional disk accesses to read batch file records, additional disk accesses are required to load an extra copy of the COMMAND.COM program into memory every time the secondary command processor is used. This liability is a trade-off against significantly increasing the size of the program. In the preferred and actually implemented embodiment of the invention, the following PC DOS batch commands are processed internally:

| CD/CHDIR | PAUSE | SHIFT |
| MD/MKDIR | MORE | REM |
| RD/RMDIR | SORT | |
| ERASE/DEL | ECHO | |
| REN(AME) | GOTO | |
| CLS | IF | |

The following PC DOS commands are passed to PC DOS:

| CHKDSK | COPY | BREAK |
| *COMP | DATE | VER |
| *DISKCOMP | DIR | SET |
| *DISKCOPY | TIME | FIND |
| *RECOVER | TYPE | *MODE |
| *SYS | FOR | *TREE |
| CTTY | VERIFY | *PRINT |
| PROMPT | VOL | ASSIGN |
| *FORMAT | *EXE2BIN | *GRAPHICS |

Those commands marked with an asterisk (*) are not internal type commands but are executable programs. The batch file memory buffer is variable in size and uses only as much memory for the file buffer as it actually requires.

Several restrictions apply to the preferred and actually implemented embodiment. First, batch commands that use global file names or redirection of input or output must be called in a batch file using "COMMAND /C" preceding the command. Redirection of input and output is another advanced function introduced with PC DOS release 2.0. Second, all batch file requests must include the .BAT file type extension. This is different from PC DOS which only requires the file name. Third, program names contained in the batch files must include the .EXE or .COM extensions. Fourth, the equal sign (=) can not be used as a command delimiter. Fifth, two calling parameters are required. Parameter one must be the size in kilobytes of the .BAT buffer, and parameter two must be the name of the first .BAT file to load. For example: BATCH 2 TEST.BAT PARM 1 PARM 2 Additional parameters can be entered. These are used as replaceable parameters, denoted as %1 to %n, when the first batch file is processed by this program.

In the drawings, usual flow diagram conventions are followed. Specifically, a diamond shaped block represents a logical operation, such as a test or compare function, and a rectangular shaped block represents a step in sequence of steps, such as initialize, load, save and the like. Many such steps, however, are themselves performed by a series of steps, called subroutines, which are called by the main program in a manner understood by those skilled in the art. Since a given subroutine may be used several times in the course of the main program, it is convenient to call the subroutine, when needed, rather than repeat the steps of the subroutine in the body of the main program. In the figures, the calling of a subroutine is noted by a reference to another figure number in the rectangular block of a process step.

Referring now to the drawings, and more particularly to FIG. 1, the program begins by entering from DOS at 1. The first operations performed are to initialize the stack pointer and the "EXEC" control block in operation blocks 2 and 3. Then, in block 4, the drive, path and filename for "COMMAND.COM" is located. A parse routine, shown in FIG. 39, is invoked in block 5 to parse the DOS command line, and then a clear screen routine, shown in FIG. 23, is invoked in block 6 to clear the video display. As indicated in block 7, the amount of memory required for the batch file code is determined and, in block 8, the start address of the batch file buffer is saved. The determination of the amount of memory required for the batch file buffer made in block 7 can be accomplished in several ways. In the preferred and actually implemented embodiment, the determination is made by a programmer who codes the size of the buffer and the name of the first batch file to be loaded in a batch file of an application program which is to be run on the batch file processing program. These parameters are passed by DOS from the command line to the batch file processing program which calculates the start address of the batch file buffer, and this start address is saved in block 8. It is also possible for the end user of the application program to key these same parameters into the command line, but this is a less desirable approach since it is preferred not to involve the end user in such tasks. Alternatively, these same steps can be accomplished by hard coding the size of the batch file buffer into the batch file processing program. In this case, the programmer writing the batch file processing program would have to make a determination as to the largest size of batch file buffer that will be allowed. The inflexibility of this approach will at once be appreciated. Yet another approach would be to make a dynamic determination of the required batch file buffer size. In this case, the batch file processing program would read the directory entry of the batch file to be loaded in order to determine the size buffer required based on the size of the particular batch file to be loaded.

At this point in the flow chart, a determination is made in decision block 9 as to whether parameter one has been entered. If it has, then in decision block 10 a determination is made as to whether parameter one is one character. If either of these decisions is resolved in the negative, the flow chart proceeds to FIG. 24. In FIG. 24, an error message is displayed, and then the program jumps to FIG. 3. For the moment, however, it will be assumed that both of the decisions represented by blocks 9 and 10 have been resolved in the affirmative so that the flow chart proceeds to FIG. 2, to which reference is next made.

Figure 2:
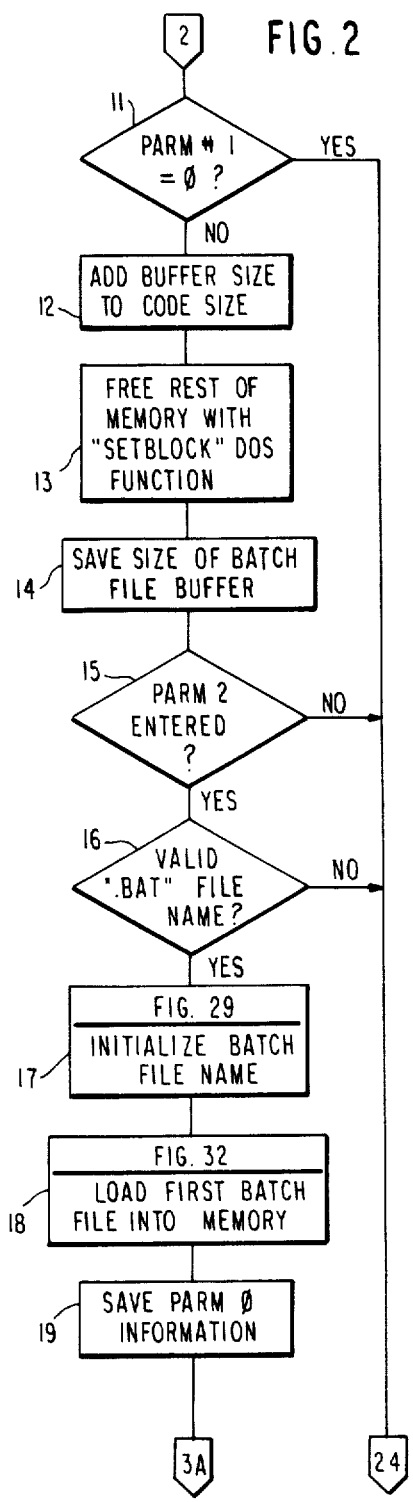

In decision block 11 of FIG. 2, parameter one is tested to determine if it is zero. If it is, the flow chart proceeds to FIG. 24 as described above. Assuming the contrary, i.e. that parameter one is not equal to zero, the buffer size is added to the code size in block 12. Then, in block 13, the rest of the memory is freed with the "SETBLOCK" DOS function and, in block 14, the size of the batch file buffer is saved. A check is then made in decision block 15 to determine if parameter two has been entered. If so, a determination is made in decision block 16 as to whether the batch file name is valid. This is done by comparing the last four characters of the file name against ".BAT". If the outcome of either of the decision blocks 15 or 16 is negative, the flow chart again proceeds to FIG. 24. Assuming that both are resolved in the affirmative, a subroutine, shown in FIG. 30, is invoked to initialize the batch file name in block 17. Then the routine of FIG. 32 is invoked to load the first batch file in memory in block 18. The parameter zero information is saved in block 19, and the flow chart then proceeds to FIG. 3 to which reference is next made.

From FIG. 2, all parameters are shifted left two parameters in block 20, using the routine shown in FIG. 10, and the saved parameter zero information is restored in block 21. Then, in block 22, the "SI" register and next logical line pointer are initialized. The flow chart next proceeds to FIG. 4.

FIG. 4 begins the loop that processes the batch file. This loop is ultimately exited by a determination in decision block 23 as to whether the end of file (EOF) has been reached. Initially, however, this determination is negative, and in block 24, the next batch command line is set up by invoking the subroutine shown in FIG. 30. The batch command line is first tested to determine if it is a label and, if it is not, to determine if it is a blank line in decision blocks 25 and 26, respectively. If either of these tests are affirmative, the program loops back to decision block 23 to again test for an end of file condition. Assuming that the batch command line is neither a label nor a blank line, the parse routine shown in FIG. 40 is invoked to get the command length in block 27. Then the "ECHO" switch is tested in block 28 to determine if it is on. If it is, the command is displayed at block 29; otherwise, it is not. Then, in block 30 set up is made to search the command table. A test is then made in decision block 31 to determine if a command was found. If a command was found, control is given to the appropriate command processor shown in FIGS. 7, 9, 11, 12, 15, 16, 17, 18, and 20 and 20, discussed in more detail hereinafter. If not, the flow chart proceeds to FIG. 5.

The portion of the program shown in FIG. 5 is a series of tests. The first of these in decision block 32 determines if a period "." is in the command name. As previously mentioned, this is a requirement for internal processing in the embodiment as actually implemented. If a period is missing from the command name, a routine is invoked to set up for the secondary command processor, and the flow chart proceeds to FIG. 8. Assuming, however, that a period does exist in the command name, the command name is next tested in decision block 34 to determine if has a file extension ".EXE". If so, the flow chart goes to FIG. 7. If not, the command name is then tested in decision block 35 to determine if it has a file extension ".BAT". If so, the flow chart goes to FIG. 6. If not, the command name is next tested in decision block 36 to determine if it has a file extension ".COM". If not, the set up is made in block 33 for the secondary processor; otherwise, the flow chart proceeds to FIG. 7.

Figure 6:
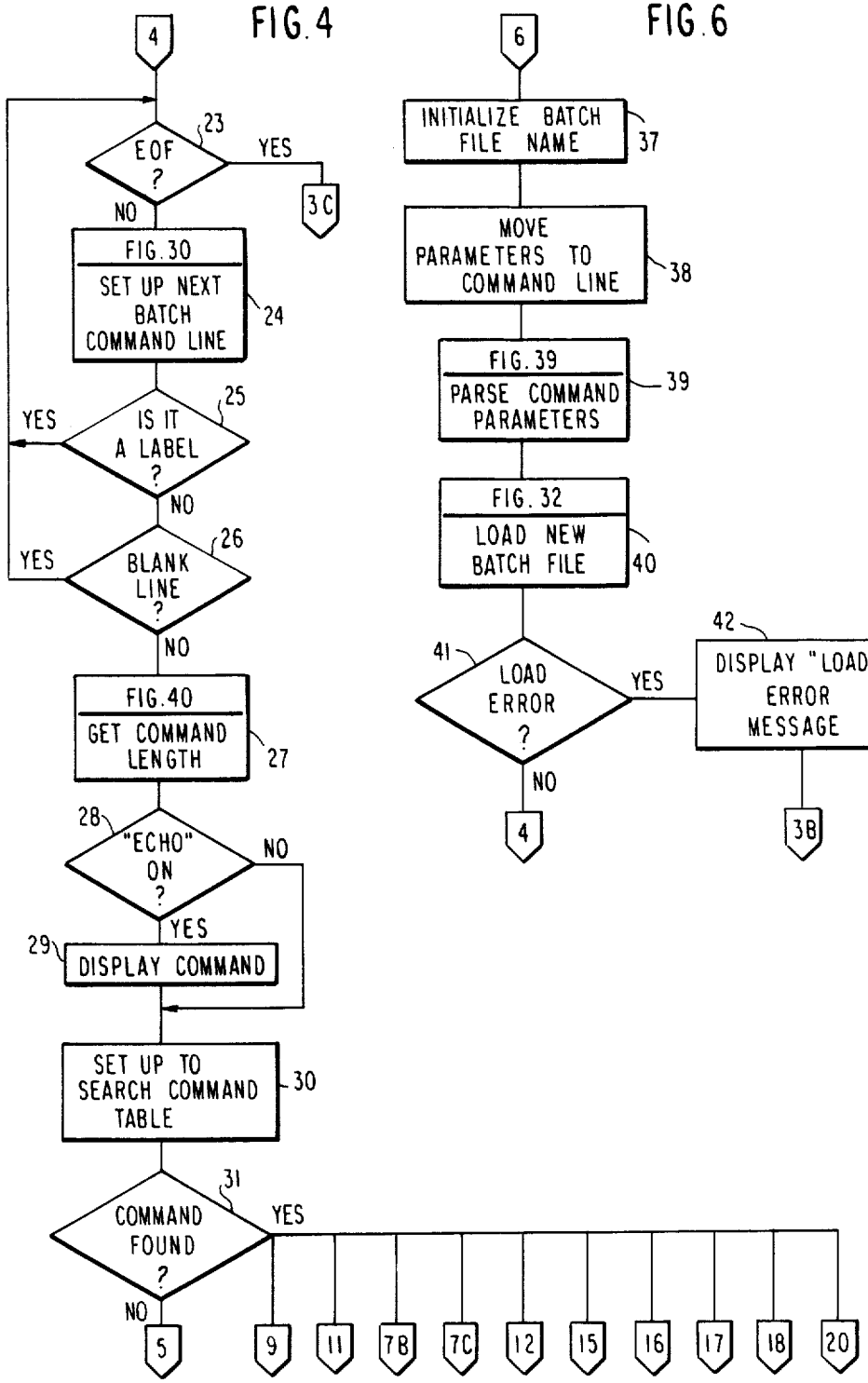

Assuming first that the command file was tested and found to have the extension ".BAT", the batch file name is initialized in block 38 shown in FIG. 6. Then the parameters are moved to the command line in block 38. The parse routine shown in FIG. 39 is invoked to parse the command parameters in block 39, and then in block 40, the routine shown in FIG. 32 is invoked to load a new batch file. At this point, a test is made in decision block 41 to determine if a load error was made. If so, a "LOAD" error message is displayed in block 42, and the flow chart loops back to FIG. 3. Otherwise, the flow chart loops back to FIG. 4 where the end of file test is again made. This time, if the end of file is found, the flow chart loops back to FIG. 3.

Returning now to FIG. 3, if a "LOAD" error message was displayed in block 42, a routine, shown in FIG. 19, is invoked in block 43 to issue a PAUSE message, and the program waits for a keystroke. When a keystroke is detected, a routine, shown in FIG. 33, is invoked to unload full screen processor (FSP) and indexed sequential access method (ISAM) in block 44. The same thing occurs when the end of file condition is detected at decision block 23 in FIG. 4. Then a routine shown in FIG. 26 is invoked in block 45 to turn the video cursor on, and control is returned to DOS in exit block 46.

Figure 7:
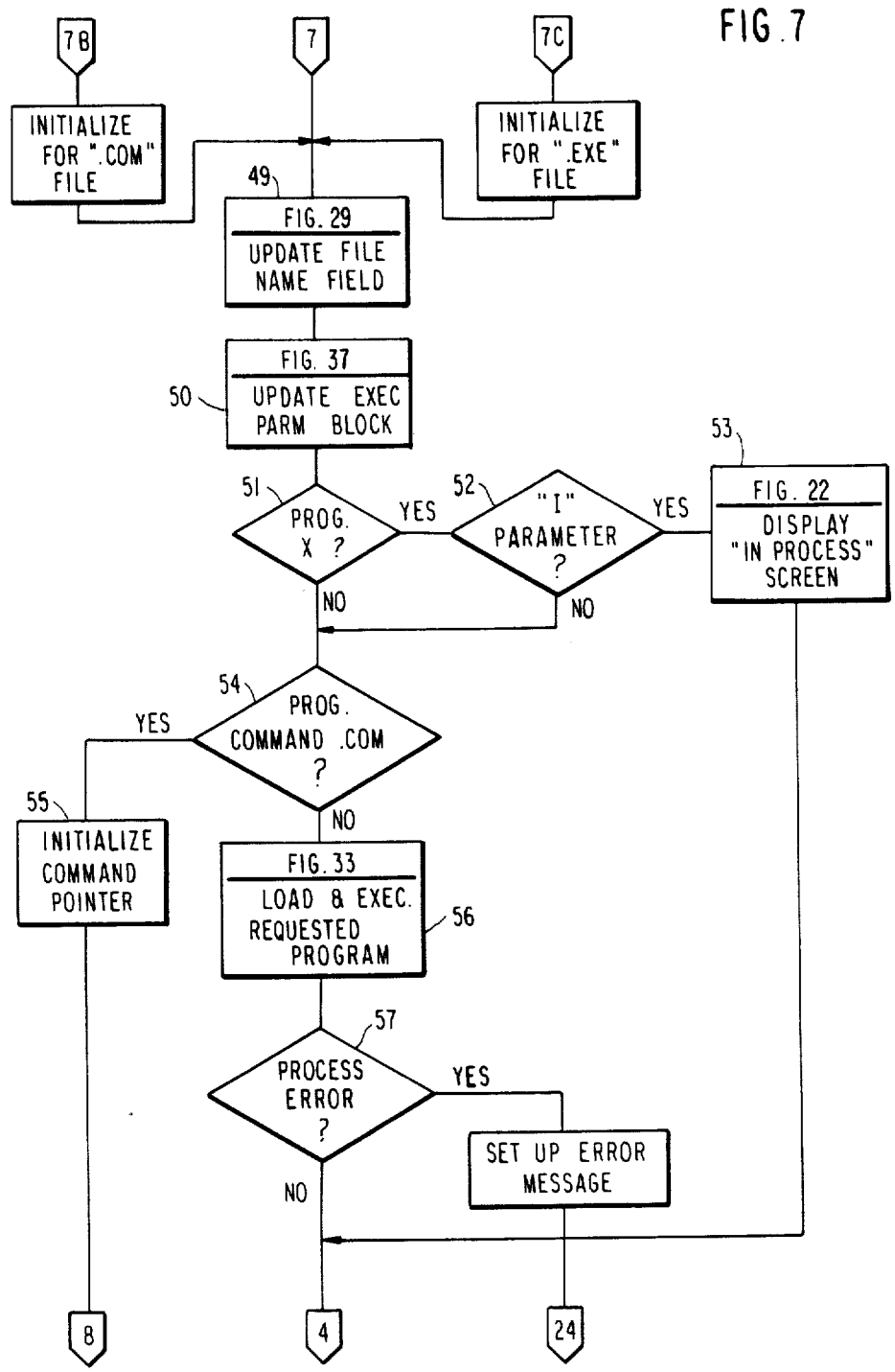

Returning to decision block 34 in FIG. 5, if the file has the extension ".EXE", the process goes to FIG. 7. The same thing occurs when the file has the extension ".COM" in decision block 36. Entry to the flow diagram shown in FIG. 7 from FIG. 5 is made at block 49 where the file name and field are updated by calling the routine shown in FIG. 29. Then, in block 50, the EXEC parameter block is updated by calling the routine shown in FIG. 37. The file is tested in decision block 51 to determine if it is a particular program. Specifically, this program is an access method loader program which includes the code for clearing the screen and displaying an "In Process" message. This program is otherwise not germane to the batch processor according to the invention but is merely used a convenience in the actually implemented preferred embodiment of the invention.

Assuming that the test in block 51 is affirmative, the file is next tested in decision block 52 for an "I" parameter. The "I" parameter is the indication that the "In Process" message is to be displayed. If the "I" parameter is found, the message "PROCESSING—PLEASE WAIT" is displayed on the screen in block 53, and the process returns to FIG. 4. On the other hand, if the tests in decision blocks 51 or 52 are negative, then the file is tested in decision block 54 for a COMMAND.COM program. If a COMMAND.COM program is found, then, in block 55, the command pointer is initialized, and the flow chart jumps to FIG. 8. It is assumed, however, that a COMMAND.COM program is not found so that in block 56 the requested program is loaded and executed by calling the subroutine shown in FIG. 33. When the requested program has been run, a test is made in decision block 57 to determine if a process error was detected, and if no process error was detected, the process returns to FIG. 4. On the other hand, if a process error was detected, the program jumps to FIG. 24 in order to display an error message.

Returning again to FIG. 5, it will be recalled that the set up for the secondary command processor was made in block 33 if either the period "." was missing in the command name in decision block 32 or the file did not have the extension ".COM", ".EXE" or ".BAT" in decision block 36. From block 32 the process goes to FIG. 8. Entry to FIG. 8 is also made from block 55 of FIG. 7. As previously mentioned, all DOS batch commands that are not processed internally are executed by invoking the secondary processor. The DOS EXEC function is used to load and execute a second copy of the COMMAND.COM program. The DOS batch command is passed to COMMAND.COM, and when processing is complete, control is returned to the batch processor. This is shown in FIG. 8 to which reference is now made. Here, the file is first checked to see if the "/C" parameter is found in decision block 58. This is the parameter that returns control to the batch processor. If the "/C" is not found, the batch command is displayed in block 59 followed by the display of the "INVALID SECONDARY COMMAND PROCESS REQUEST" error message in block 60, at which point the process returns to FIG. 3. Assuming, however, that the "/C" parameter is found in decision block 58, the rest of the data is moved to the command line in block 61, and the "/C" parameter is inserted into the command line in block 62. Then, in block 63, the secondary command processor is loaded and executed by invoking the subroutine shown in FIG. 33. When execution is completed, the file is tested in decision block 64 to determine if a process error was detected. If so, the "ERROR OCCURRED WHILE EXECUTING SECONDARY COMMAND PROCESSOR" error message is set up in block 65, and the process goes to FIG. 24. If not, the process returns to FIG. 4.

This completes the description of the main module of the batch processor. The various command processors will now be described. It will be recalled that the appropriate command processor was entered from decision block 31 of FIG. 4. The first of the command processors is the SHIFT command processor shown in FIG. 9. This comprises but a single block 66 in which the parameters are shifted to the left. However, this process is carried out by invoking the shift subroutine shown in FIG. 10, to which reference is now made.

In FIG. 10, the first step in the shift subroutine is to shift the parameter table up one element in block 67.

Then, in block 68, the parameter count is updated. The resulting parameter count is tested in decision block 69 to determine if it exceeds the count of eight. If it does, then in block 70, the next parameter is located from the batch command, and in block 71, the parameter table is updated by calling the subroutine shown in FIG. 39. At this point, a return is made to the program which called the shift subroutine as indicated by the return block 72. A similar result obtains if the test in decision block 69 had been negative.

The DIRECTORY command processor is shown in FIG. 11. There are several DOS directory commands. These include MAKE DIRECTORY or MD, CHANGE DIRECTORY or CD and REMOVE DIRECTORY or RD. The data following the command is used to request DOS to change a sub-directory using DOS functions 39h, 3Ah and 3Bh. Depending on which command is present, the first step is to initialize for that command as indicated in blocks 73, 74 and 75. Once initialized, the process is the same for each of these commands. Then, in block 76, the rest of the command is located by calling the subroutine shown in FIG. 40. The subroutine shown in FIG. 29 is called in block 77 to move data to the name field. Then, in block 78, the command is executed by using the function call mechanism identified as INT 21 in the *Disk Operating System, Technical Reference* manual mentioned above. When the command has been executed, a test is made in decision block 79 to determine if there was a process error. If there was, then in block 80, an error message is issued by calling the subroutine shown in FIG. 27, and then the process returns to FIG. 4 to look for the next command in the batch file. If there was no process error, the process returns immediately to FIG. 4.

Figure 12:
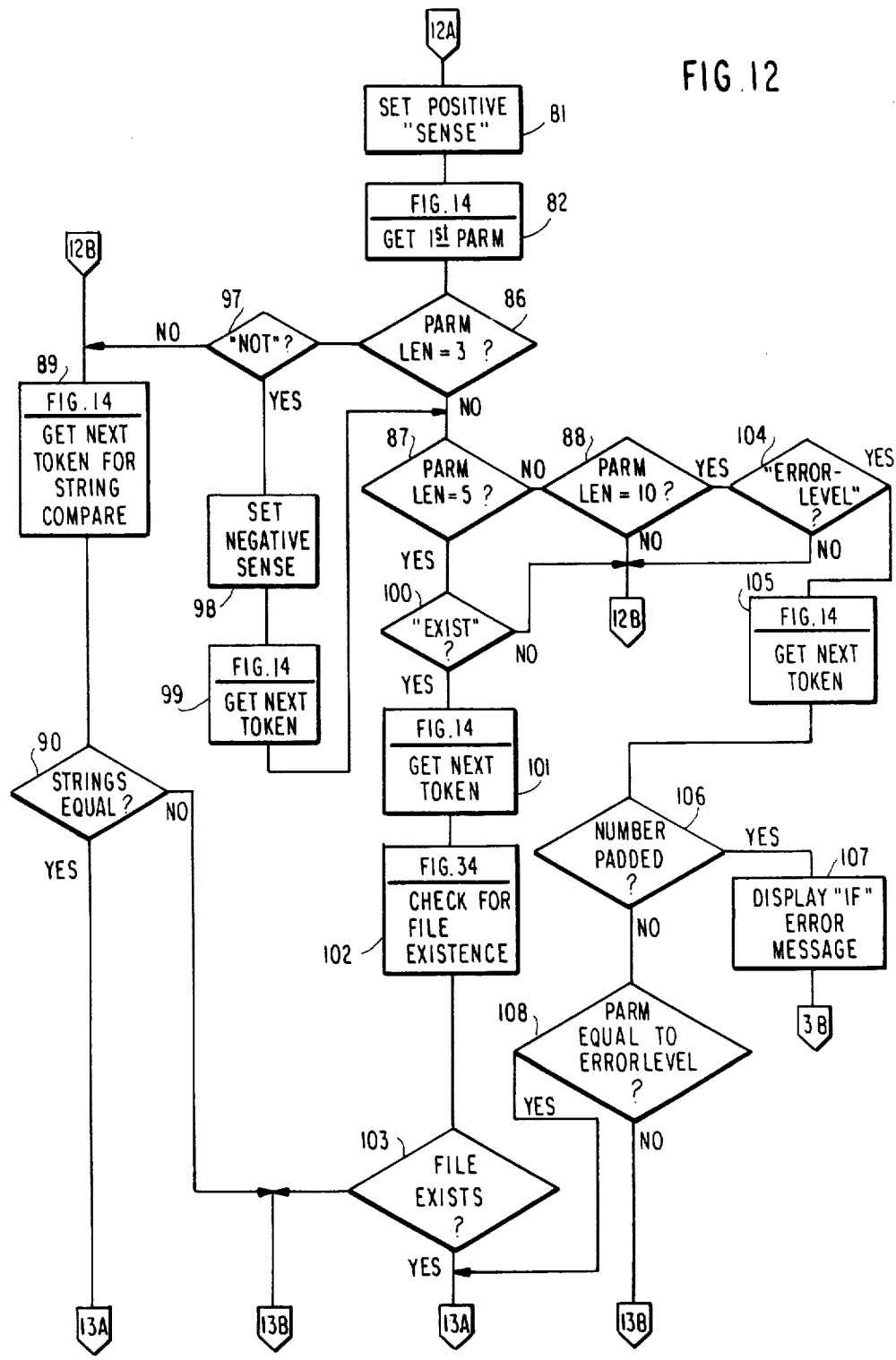

The IF command processor is shown in FIGS. 12 and 13. This process determines the sense (positive or negative) of the if command. A compare is made to see if the IF command is testing for equal strings, for existance checking, or for errorlevel checking. The process also determines if the condition being tested is true or false. The next logical line pointer is positioned to the "THEN" command or it is left pointing to the "ELSE" command based on the sense of the IF command and the condition being tested. The first step in block 81 is to set the "sense" function positive. Then the first parameter is gotten in block 82 by invoking the if subroutine shown in FIG. 14. This is a short subroutine itself consisting of subroutine calls. As shown in FIG. 14, the first step in block 83 is to scan for the next token by invoking the subroutine shown in FIG. 40. Then, in block 84, a scan is made to the end of the parameter, again by invoking the subroutine shown in FIG. 40. At the return block 85, the process returns to block 82 in FIG. 12. At this point, a series of tests are made. First, in decision block 86, the parameter length is tested to see if it is equal to three. If it is not, it is tested in decision block 87 to see if the parameter length is equal to five. If it is not, is is tested again in decision block 88 to see if the parameter length is equal to ten. If it is not, then the process goes to block 89 to get the next token for the string compare operation. This is done by again invoking the subroutine shown in FIG. 14. Then, in decision block 90, the strings are compared to determine if they are equal. If they are, the process goes to block 91 of FIG. 13; otherwise, the process goes to block 92 of FIG. 13.

In block 91 of FIG. 13, the "sense" function is exclusive ORed with "TRUE", while in block 92, it is exclusive ORed with "FALSE". The results of both blocks are tested in decision block 93 to determine if the "IF" condition is satisfied. If not, the process jumps directly to FIG. 4 to process the next command. On the other hand, an affirmative result of the test in decision block 93 causes the process to go to block 94 to get the next command by again invoking the subroutine shown in FIG. 14. Then the token count is tested in decision block 95 to determine if it is zero. If it is not, the process loops back to block 94; otherwise, the next logical command line is set up in block 96 before returning to FIG. 4.

Returning now to FIG. 12, assume that the test in decision block 86 has been positive. In this case, the token is compared in decision block 97 to "NOT". If this compare is negative, the parameter must be a string, and the process goes to block 89. On the other hand, if the compare is positive, the negative sense is set in block 98. Then, in block 99, the next token is gotten by again invoking the subroutine shown in FIG. 14. The process then goes to decision block 87.

Assume this time that the test made in decision block 87 is positive. In this case, the token is compared to "EXIST" in decision block 100, and if that compare is negative, the process goes again to block 89 to get the next token for string compare. However, if the "EXIST" compare is positive, then the next token is gotten in block 101 by once again invoking the subroutine shown in FIG. 14. Then, in block 102, the subroutine shown in FIG. 34 is invoked to check for file existance. If the file exists as determined in decision block 103, the process goes to block 91 of FIG. 13; otherwise, it goes to block 92.

Going back now to decision block 88, assume now that the length was found to be equal to ten. In this case, a compare is made to "ERRORLEVEL" in decision block 104. If the compare is negative, the process once again goes to block 89 to get the next token for string compare; otherwise, the next token is gotten in block 105 by again invoking the if subroutine shown in FIG. 14. The token is then checked in decision block 106 to determine if the number is padded. If it is, an "IF COMMAND SYNTAX ERROR" error message is displayed in block 107 and the process returns to FIG. 3 in preparation to return control to DOS. If the number is not padded, the parameter is tested in decision block 108 to determine if the parameter is equal to "ERRORLEVEL". If it is, the process goes to block 91 in FIG. 13; otherwise, it goes to block 92.

The GOTO command processor is shown in FIG. 15, and its purpose is to find the goto label and its length. The processor starts at the top of the .BAT buffer and scans for a tag that is equal to the goto label. When it is found, the next logical line pointer is set to the label so that execution will resume at that point. As shown in FIG. 15, the first step is to compute the length of the scan which is done in block 109. Then, in block 110, the label name is isolated. This is followed in block 111 by searching the batch file buffer for the label. A test is made in decision block 112 to determine if the end of the buffer has been reached. If it has, then a "LABEL NOT FOUND" error message is displayed in block 113, and the process returns to FIG. 3 in preparation for returning control to DOS. However, if the test in decision block 112 is negative, a test is made in decision block 114 to determine if the label has been found. If not, the program loops back to block 111; otherwise, the next logical line pointer is updated in block 115, and the process goes to FIG. 4 to await the next command.

The ECHO command processor is shown in FIG. 16, and its purpose is to determine if the first parameter is "ON" or "OFF". If so, the echo switch is set accordingly. If the first word is not "ON" or "OFF", then the entire line past the echo command is printed. As shown in FIG. 16, a test is first made in decision block 116 for parameters. If there are none, then a blank line is displayed in block 117, and the process goes immediately to FIG. 4 to await the next command. If there are parameters, then a series of tests are performed. The first of these, in decision block 118, is to test to see whether the parameter length is equal to two. If it is, the parameter is compared in decision block 119 to "ON". If the parameter is "ON", the "ECHO" switch is set on in block 120, and the echo line is displayed in block 121. If the parameter is not "ON" in decision block 119, the echo switch is not set, and the process goes directly to block 121.

If the test in decision block 118 had been negative, the parameter length is then tested to see if it is equal to three in decision block 122. If it is, then the parameter is compared to "OFF" in decision block 123. If the parameter is "OFF", the "ECHO" switch is set off in block 124; otherwise, the process goes directly to block 121. After the "ECHO" switch is set off in block 124, a test is made in decision block 125 to determine if echo was "ON" before. If so, the process goes to block 121; otherwise, the process goes to FIG. 4 to process the next command. After displaying the echo line in block 121, the process also goes to FIG. 4 to process the next command.

The ERASE command processor is shown in FIG. 17, and its purpose is to delete a data or program file from a disk library. As shown in FIG. 17, the first step in block 126 is to set up the file name to be deleted. Then, in block 127, the DOS function call INT 21 is made to delete the file. When complete, a test is made in decision block 128 to determine if an error was detected. If so, the process goes to FIG. 24 to display an error message before going to FIG. 3 in preparation for returning control to DOS. If, however, no error was detected, then the process returns to FIG. 4 to await the next command.

The PAUSE command processor is shown in FIG. 18, and its purpose is to display the message "Strike a key to continue . . . " and then wait for the next keystroke. As shown in FIG. 18, the PAUSE command processor consists of but a single step, denoted by block 129, which is to issue that message. This step is performed by the pause subroutine shown in FIG. 19, to which reference is now made.

The pause subroutine shown in FIG. 19 is itself a series of subroutine calls. The first of these, in block 130, is to display the message by invoking the subroutine shown in FIG. 27. Then, in block 131, the cursor is turned on by invoking the subroutine shown in FIG. 26. In block 132, the subroutine shown in FIG. 28 is invoked to wait for a keystroke. Then, in block 133, a carriage return (CR) and line feed (LF) are sent to the display through the DOS function call INT 21. At this point, the process returns to block 129 of FIG. 18 as indicated by the return block 134. The PAUSE command is then completed, and the process returns to FIG. 4 to await the next command.

The RENAME command processor is shown in FIG. 20, and its purpose is to rename a file. The first step, in block 135, is to locate the old filename and then, in block 136, to locate the new filename. In block 137, the DOS function call INT 21 is made to rename the file. When complete, a test is made in decision block 138 to determine if an error was detected. If so, the process goes to FIG. 24; otherwise, the process goes to FIG. 4 to process the next command in the batch file.

FIGS. 21, 22 and 23 are common screen process routines. The first of these, shown in FIG. 21, consists of a single step, denoted by block 139, which invokes the clear screen process shown in FIG. 23. Then, the process returns to FIG. 4 to process the next command in the batch file The subroutine shown in FIG. 22 also invokes the clear screen routine in FIG. 23 in block 140, but then, in block 141, displays an "In process" message. After block 141, a return is made to the program which called the subroutine as indicated by the return block 142.

FIG. 24 has been mentioned several times before in connection with the testing for detected errors in executing a process. If an error has been detected, the process always goes to FIG. 24 where, in block 143, an error message is displayed. Then the process goes to FIG. 3 in preparation for returning control to DOS.

FIGS. 25 and 26 show common cursor routines. FIGS. 27 and 28 shown common input/output routines These figures are self-explanatory, and no further discussion of them will be presented.

The subroutine shown in FIG. 29 was called by block 17 in FIG. 2 during the initialization process. The first step in this process is the blank out the file name field in block 143, and then the next file name character is gotten in block 144. The character is tested in decision block 145 to determine if it is a delimiter. If it is not, it is tested again in decision block 146 to determine if it is a "%" character indicating a variable in the batch command. If it is a "%" character, a parameter is substituted for it by invoking the subroutine shown in FIG. 31, and then the charcter is put in the file name field in block 148. The same thing happens if the test in decision block 146 had been negative. In either case, the routine loops back to block 144 to get the next file name character. Again, the character is tested in decision block 145 to determine if it is a delimiter, and if it is, an ASCIIZ string is created in the file name field in block 149. An ASCIIZ string is an ASCII string terminated with a byte of binary zero (00). Then, as indicated by return block 150, the process returns to block 17 in FIG. 2.

The subroutine shown in FIG. 30 is called from block 24 in FIG. 4 which sets up the next batch command line. The first step in this subroutine is to locate the next command in the batch buffer as indicated by block 151. Next, the first or next character, as the case may be, is gotten from the batch file buffer in block 152. The character is tested in decision block 153 to determine if it is a "%" character indicating a substitutable variable. If it is, the variable is substituted in block 154 by invoking the subroutine shown in FIG. 31, and then the process loops back to block 152. If the character is not a "%" character, the character is stored in the $EXE_{13}$ CMD__ LIN field in block 155. A test is then made for the end of the line. If the test is negative, the process loops back to block 152; otherwise, a return is made by the subroutine as indicated by block 157.

The subroutine shown in FIG. 31 is called from block 147 in FIG. 29 or block 154 in FIG. 30. This subroutine gets the number of the parameter to substitute for the "%" character. The procedure illustrated is self-explanatory and will not be further described.

FIG. 32 shows the subroutine for loading batch files into memory. This subroutine is called from block 18 in FIG. 1 and block 40 in FIG. 6. The first step in this routine is to open the filename in block 158. This is done with the DOS function call INT 21. In decision block 159, a test is made for an open error. If an error is detected, the subroutine terminates by returning to the place in the main program where it was called. Otherwise, the file is read into the batch buffer in block 160 and the filename is closed in block 161, both using DOS function call INT 21. Then, in decision block 162, a test is made for a close error. If the test is positive, the subroutine terminates, otherwise, a test is made in decison block 163 for an overflow in the batch buffer. If an overflow is detected, the process goes to FIG. 24 to display an error message in preparation to return control to DOS. If no buffer overflow is detected, the end of the batch file buffer is marked in block 164, and the file name is saved for %0 substitution in block 165. At this point, the subroutine returns to the point in the main program where it was called.

FIGS. 33 to 37 are additional common subroutines which are, for the most part, self-explanatory. However, with reference to FIG. 34, the first step in this subroutine is to set the disk transfer area (DTA). The DTA is also commonly called buffer and is the memory area DOS will use to contain the data for all reads and writes that are performed with the traditional set of function calls. Further information on the DTA is contained in the above-referenced manual entitled *Disk Operating System, Technical Reference.*

The last three figures are parse subroutines the purpose of which is to build a table of parameter information from the DOS command line at 80*h* into the program segment prefix. Each table entry will contain a one-byte length and a two-byte offset of each parameter found. The parse subroutine shown in FIG. 39 is called, for example, at block 5 in FIG. 1 and at block 39 in FIG. 6. The subroutine in FIG. 39 is entered from a call made at block 71 in FIG. 10. The subroutine shown in FIG. 40 is called, for example, from block 40 in FIG. 1 and from block 84 in FIG. 14.

The invention has been described with respect to a preferred embodiment thereof, but it will be understood by those skilled in the art that changes may be made therein without departing from the spirit and scope of the invention.

Having thus described my invention, what I claim as new, and desire to secure by Letters Patent is:

1. A batch file processing method for improving the performance of application programs run on a computer under a disk operating system comprising the steps of:

determining the amount of storage required as a variable function of a batch file to be processed and establishing a batch file buffer of appropriate size;

loading the batch file into the buffer for processing;

interrogating the batch file in the buffer one logical record at a time to find the commands contained in the batch file;

passing control to one of a plurality of internal routines to process at least some of the commands found in the batch file without requiring disk accesses; and upon completion of a command, returning control for further processing of batch commands in the batch file.

2. The method recited in claim 1 wherein some of the batch commands are not processed by internal routines, said method further comprising the steps of:

setting up a secondary processor;

passing those batch commands for which there are not internal routines to the disk operating system for processing; and upon completion of a command passed to the disk operating system, returing control for further processing of batch commands in the batch file.

3. The method recited in claim 2 further comprising the steps of:

passing a request to the disk operating system to load and execute an application program; and when the application program terminates, returning control to process further commands in the batch file.

4. The method recited in claim 3 further comprising the steps of:

receiving indicators returned from the disk operating system in order to detect an abnormal termination condition of the application program; and discontinuing batch file processing if the application terminates abnormally.

5. The method recited in claim 1 further comprising the step of passing by the disk operating system parameters indicative of the size and name of the batch file to be loaded to said batch file processing method and wherein the step of determining the amount of storage required is performed by calculating the amount of storage required using the parameters passed by the disk operating system.

6. The method recited in claim 1 wherein the step of determining the amount of storage required is performed by calculating the size of the largest batch file that can be processed and encoding the calculated size into said batch file processing method.

7. The method recited in claim 1 wherein the step of determining the amount of storage required is performed dynamically by reading a directory entry of a batch file to be loaded to determine the size of the batch file buffer required for that batch file.

* * * * *